No. 780,964. PATENTED JAN. 24, 1905.
F. MOENNIGHOFF.
LAWN MOWER ATTACHMENT.
APPLICATION FILED SEPT. 26, 1903.
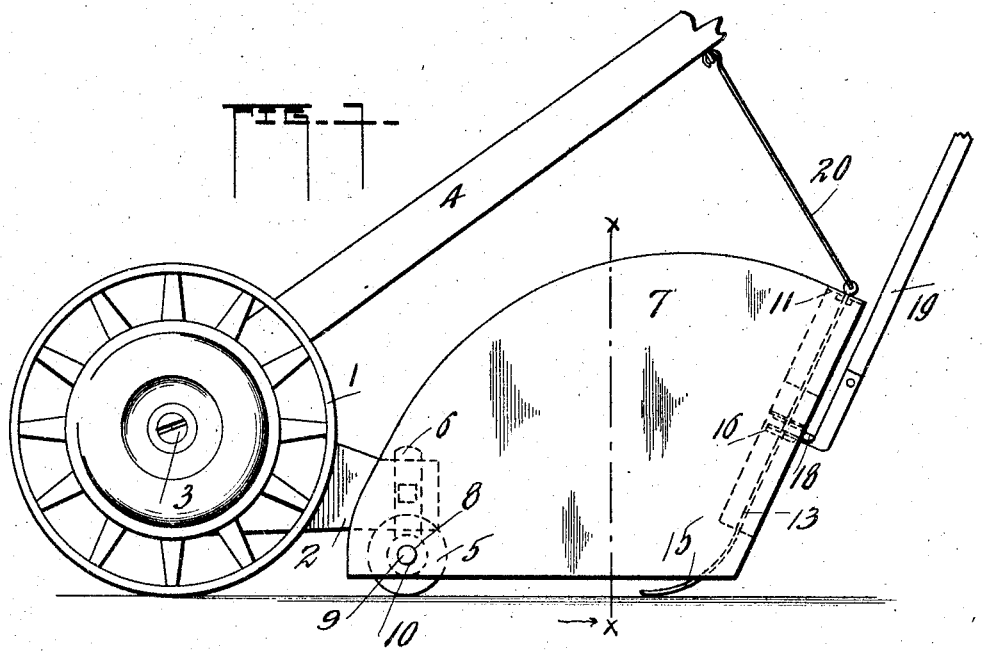
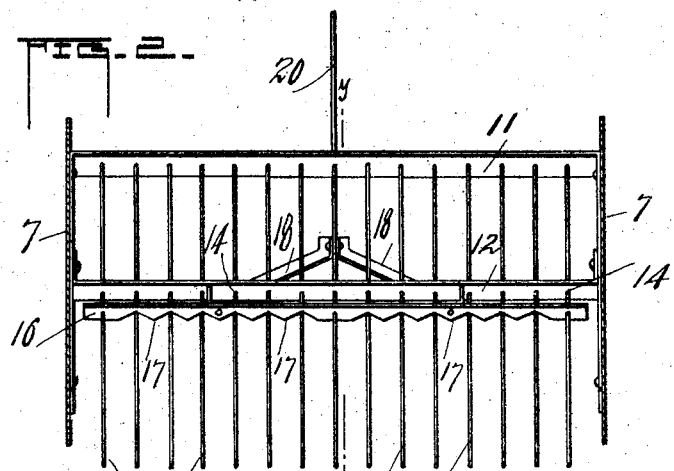
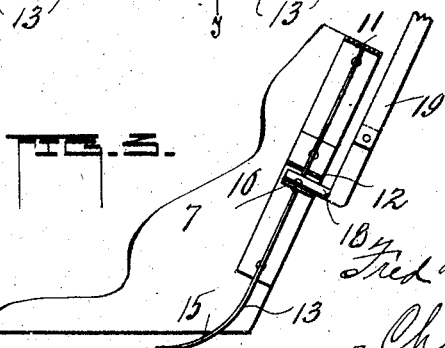
Witnesses:
Anna C. Riez
A. B. LaPorte
Inventor:
Fred Moenninghoff
By Chas. N. LaPorte
Atty.

No. 780,964. Patented January 24, 1905.

UNITED STATES PATENT OFFICE.

FRED MOENNIGHOFF, OF PEORIA, ILLINOIS.

LAWN-MOWER ATTACHMENT.

SPECIFICATION forming part of Letters Patent No. 780,964, dated January 24, 1905.

Application filed September 26, 1903. Serial No. 174,737.

*To all whom it may concern:*

Be it known that I, FRED MOENNIGHOFF, a citizen of the United States, residing at Peoria, in the county of Peoria and State of Illinois, have invented certain new and useful Improvements in Lawn-Mower Attachments; and I do hereby declare that the following is a full, clear, and exact description of the invention, which will enable others skilled in the art to which it appertains to make and use the same.

This invention has reference to lawn-mowers, and relates more particularly to an attachment therefor, combining as its principal features a rake and grass-catcher.

The object of the invention is to provide for lawn-mowers a simple and efficient rake attachment comprising a suitable frame supporting a series of tines and arranged to be suitably coupled to the mower-frame.

A further object is to provide a cleaning plate or bar slidable upon two or more tines and having parts operating between adjacent tines for the purpose of cleaning the rake of grass, leaves, &c., and means connected with the cleaning-bar for sliding it up and down upon the tines.

That the invention may be more fully understood, reference is had to the accompanying drawings, in which—

Figure 1 is a side elevation of a mower with my improvements attached thereto. Fig. 2 is an elevation on the line X X of Fig. 1. Fig. 3 is a cross-section on the line Y Y, Fig. 2.

My aim in the present invention is to provide for lawn-mowers an attachment which may be readily and conveniently attached and detached therefrom, pivotally connected with the frame of the mower and following in its wake, provided with a rake the tines of which rake along the grass, gathering up the loose grass, the leaves, and other loose material, thus accomplishing in one operation what has usually required two and doing the work that the usual grass-catcher does.

In the drawings so much of a lawn-mower has been shown as will properly illustrate the mode of attaching my device and its function.

1 indicates the ground-wheel journaled to frame parts 2 by the spindle 3. There are employed, of course, two wheels and two frame parts 2, and between the same are arranged the rotary and stationary cutters.

4 denotes an operator's handle connected in the usual manner to parts of the mower-frame. Following in the wake of the wheels and rotary cutter is the usual following roller 5, journaled in the brackets 6, adjustably supported on the rear end of the frame parts 2. The mower parts described are contained in the standard types of mowers and no special claim is herein made thereon.

The improvements to which I refer comprise the side plates 7, their forward portions adapted to be pivotally attached at 8 to the spindles 9, forming part of the roller 5; but I am not necessarily confined to this particular mode of attaching, as other means may be devised that would serve the same purpose, the plates perforated at 10 to provide for making such attachment.

11 indicates a cross brace or plate, its opposite ends connecting with the opposite plates 7 in manner shown. This brace is placed at the upper rear end of the plates 7 and approximately half-way down, and at the rear of such plates is shown a brace or plate 12, its opposite ends connecting with the plates 7 in manner shown.

13 denotes a series of tines arranged at suitable distances apart from each other and made of the material best suited to the work designed to be done. They pass through perforations 14 in the brace 12, and their upper ends are secured in the brace 11, the lower ends of the tines curved forwardly, as shown at 15. It is to be noted that the tines are disposed vertically and at an incline; but this arrangement may be modified.

16 refers to what may be termed a "cleaning-bar" carried transverse between the plates 7 and slidable up and down upon the tines, with the extreme outside and center tines passing through the bar, serving as a guide therefor in its movement. However, this arrangement has been made for convenience and may be modified. The bar is provided with V-shaped portions, corrugations, or serrations 17, the pointed portions of which extend down between adjacent tines. (See Fig. 2.) To the bar 16 are attached connecting-plates 18, which in turn are connected to an operating arm or lever 19, extending up alongside the operator's handle 4, whereby the operator may force the bar 16 downwardly for the purpose of removing grass, leaves, and other material from the tines and then return the bar 16 again to its normal raised position.

The rear end of the frame parts comprising the complete attachment may be raised to retain the tines in a proper relation with the grass by means of the rod 20, connected with the brace 11 and the handle 4, as shown, or a chain or other suitable device may be employed for such purpose.

The pivotal connection of the frame, as at 8, permits the frame to be swung, and using the spindle of the roller 5 the forward end of the frame will follow the rise and fall of the ground.

As suggested, modifications and details may be resorted to, and I do not wish to be confined to the details set forth.

What I claim is—

1. In a lawn-mower, the combination with the frame thereof, of parallel frame parts having a detachable connection upon opposite sides of the main frame, a rake supported between the frame parts and a cleaning-bar slidable upon the tines of the rake, as and for the purposes set forth.

2. In a lawn-mower, the combination therewith of frame parts supported to the rear thereof, a series of tines forming a rake supported between the frame parts, a cleaning-bar slidable upon the tines, guided by two or more of the tines passing through perforations in the bar, said bar provided with V-shaped portions the pointed ends of which extend down between adjacent tines, and means for raising and lowering the bar, for the purposes set forth.

3. In a device of the character described, the combination with the frame parts 2 adapted to support mowing devices, the spindle 9 carrying the roller 5, of the plates 7 having perforations adapted to slip over the ends of spindle 9 and be supported thereby, braces 11 and 12 between the plates 7, the tines 13 supported by the braces and the cleaning-bar 16 slidable upon the body of the tines, for the purposes set forth.

4. An attachment for mowers comprising parallel side plates, their forward ends adapted to be attached to a mower-frame, braces connecting their rear portions, tines supported by said braces, and means for cleaning the tines of material gathered thereon, substantially as described.

5. An attachment for mowers, comprising a frame adapted for pivotal connection with the mower-frame, means for supporting the rear end of the frame from the mower-handle, a series of tines supported by the frame, a transverse cleaning-bar having portions operating between adjacent tines, and means for raising and lowering the cleaning-bar.

In testimony whereof I affix my signature in presence of two witnesses.

FRED MOENNIGHOFF.

Witnesses:
CHAS. W. LA PORTE,
ROBERT N. McCORMICK.